United States Patent Office 3,812,110
Patented May 21, 1974

---

3,812,110
7-(1,4-CYCLOHEXADIENYL-ACYLAMINO) CEPHALOSPORINS
Bong Kuk Lee, Old Bridge, N.J., Dewey D. Y. Ryu, Holliston, Mass., and Gennaro John Miraglia, East Brunswick, Harold I. Basch, Somerset, and Barid B. Mukherjee, East Windsor, N.J., assignors to E. R. Squibb & Sons, Inc., Princeton, N.J.
No Drawing. Continuation-in-part of abandoned application Ser. No. 229,170, Feb. 24, 1972. This application Aug. 21, 1972, Ser. No. 282,096
Int. Cl. C07d 99/24
U.S. Cl. 260—240 G          8 Claims

ABSTRACT OF THE DISCLOSURE

This invention relates to new cephalosporin derivatives and methods for preparing the same, said derivatives having the structure

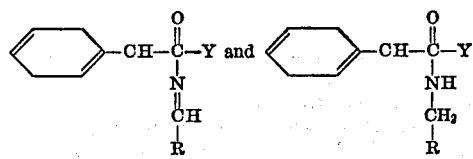

wherein Y is 7-ACA or 7-ADCA, or an ester or salt thereof, and R is phenyl, substituted phenyl, naphthyl, substituted naphthyl, lower alkyl or cycloalkyl. These compounds are useful as antibacterial agents.

RELATED APPLICATION

This application is a continuation-in-part of our copending application Ser. No. 229,170, filed Feb. 24, 1972, now abandoned.

This invention relates to new cephalosporin derivatives of the formula

I
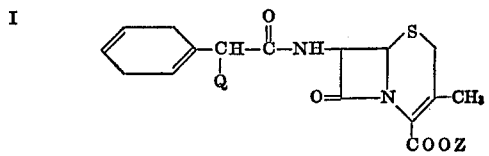

and

II
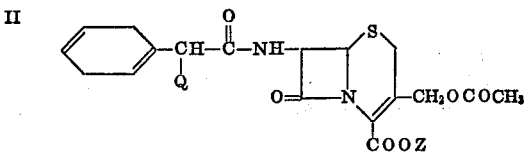

wherein Z is hydrogen, lower alkyl or a salt forming ion, e.g., an alkali metal such as sodium or potassium, an alkaline earth metal such as calcium or magnesium, or that of an organic base such as dibenzylamine, N,N-dibenzylethylenediamine, or the like, and Q is

—N—CH=R or —NH—CH$_2$—R wherein R is aryl, substituted aryl, lower alkyl or cycloalkyl.

Thus, the cephalosporin derivatives of the invention include the following sub-genuses:

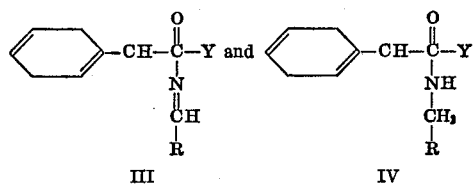

III    IV wherein Y is 7-aminocephalosporanic acid (7–ACA) or 7-aminodesacetoxycephalosporanic acid (7–ADCA) and R is phenyl, substituted phenyl, naphthyl, substituted naphthyl, lower alkyl or cycloalkyl. The phenyl or naphthyl substituents include halogen, hydroxy, amido, alkanoyl of up to 7 carbon atoms, alkoxy of up to 7 carbon atoms, or alkyl of up to 7 carbon atoms, preferably in the ortho or β-position.

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below as well as halogen (Cl, Br, I or F).

The term "aryl" includes phenyl or naphthyl. These radicals can include as substituents at the ortho position halogen, hydroxy, alkanoic acid, lower alkoxy, amido or any of the alkyl groups mentioned hereinbefore.

For example, aryl radicals and substituted aryl radicals contemplated herein include, but are not limited to, the following:

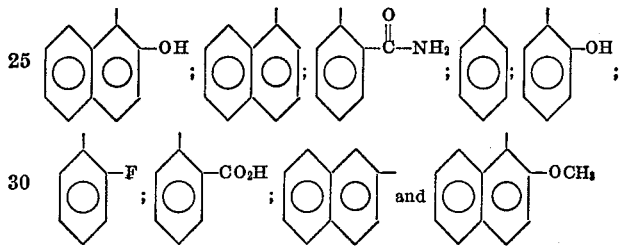

The term "cycloalkyl" includes monocyclic carbocyclic radicals having from 3 to about 6 carbons such as cyclopropyl, cyclobutyl, cyclopentyl and cyclohexyl.

The compounds of formula III can be prepared by reacting a compound of the structure V
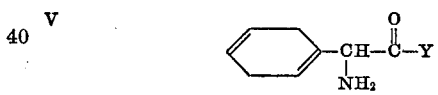

with an aldehyde of the structure

VI          RCH
             ‖
             O to form compounds of the structure III
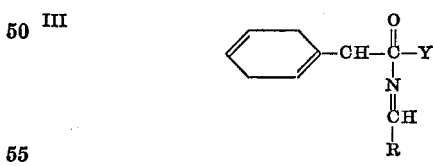

In carrying out the above reaction, the reaction of compound V with the aldehyde VI is preferably carried out in an aqueous media such as in a mixture of water with a lower alkanol such as methanol, ethanol or n-propanol, or ketones such as methylethyl ketone or methyl isobutyl ketone. The reaction may be carried at temperatures ranging from about 0 to about 40° C. Compound V is employed in a ratio to compound VI within the range of from about 1:1 to about 1:3, preferably from about 1:1 to about 1:1.5 and optimally at about 1:1.1.

Compounds of formula III can also be prepared by reacting a compound of the formula VII
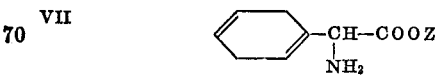

with an aldehyde of formula VI to form a compound of the formula

VIII 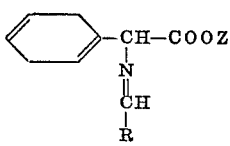

and thereafter reacting VIII with an acid halide compound of the structure

IX 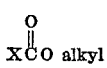

to form a mixed anhydride of the structure

X 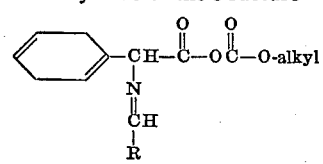

which is reacted with 7–ACA or 7–ADCA

XI 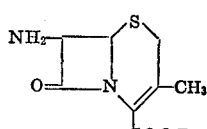

or

XII 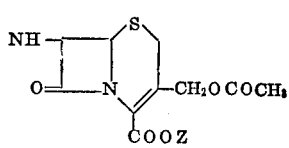

to form the formula III compounds.

The reaction of compound VII with the aldehyde VI is carried out in the presence of an aqueous-alcoholic solvent, such as a mixture of water and methanol, at temperatures ranging from ambient temperature to the boiling point of the solvent. Compound VII can be employed in a molar ratio to the aldehyde VI within the range of from about 1:1 to about 1:3 and preferably from about 1:1 to about 1:1.5.

The reaction of compounds VIII and IX is carried out in a mixture of solvents such as acetone, dioxane and lutidine at temperatures ranging from about −10 to about 20° C. and preferably from about −10 to about 10° C., employing a molar ratio of IX:VIII within the range of from about 1:1 to about 3:1 preferably 1.1:1 to 1.5:1.

The reaction of the mixed anhydride X with 7–ACA or 7–ADCA is carried out in an aqueous solvent such as aqueous sodium bicarbonate at a temperature with the range of from about −15° to about 5° C. and preferably from about −5° to about 0° C. employing a molar ratio of X:XI or X:XII within the range of from about 1:0.8 to about 2:1 and preferably from about 1.1:1 to about 1.5:1.

Compounds of formula III can be reduced by reacting III with a reducing agent such as sodium borohydride, aluminum borohydride, lithium aluminum hydride, or hydrogen in conjunction with a catalyst for reduction such as platinum or palladium to form compounds of the structure IV 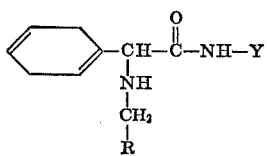

The above reduction can be carried out in water or aqueous solvents, such as aqueous potassium phosphate, at temperatures ranging from about 0 to about 40° C.

and preferably from about 10 to about 20° C. employing a molar ratio of compound III to reducing agent within the range from about 1:2 to about 1:10 and preferably from about 1:4 to about 1:6.

Alternatively, the formula IV compounds can be prepared by forming compounds of formula VIII above, reducing the formula VIII compound by reacting it with any of the aforementioned reducing agents to form a compound of the formula XIII 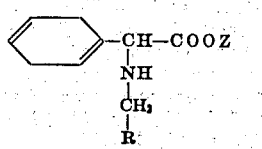

and thereafter reacting XIII with an acid halide of structure IX to form the mixed anhydride of formula XIV.

XIV 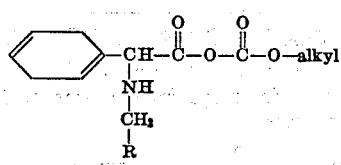

which can be reacted with 7–ACA or 7–ADCA to form the formula IV compounds.

It will be appreciated that essentially the same reaction conditions as set out with respect to the reaction of compounds VIII, IX, X and XI apply here as well.

The starting materials of structure V are disclosed in U.S. Pat. No. 3,485,819 to Weisenborn, et al., and are prepared by coupling a compound of the structure XV 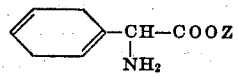

with a 7–ACA or 7–ADCA moiety, that is with

XI 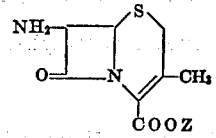

or

XII 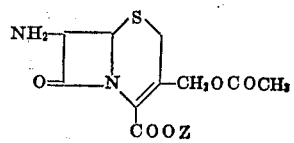

as described in Pat. No. 3,485,819.

Examples of aldehydes which can be employed herein as starting materials include, but are not limited to, the following

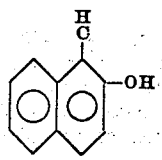

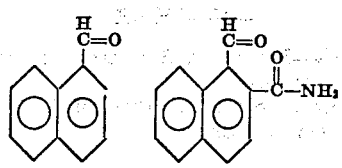

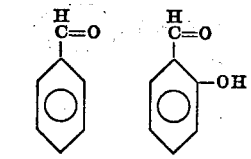

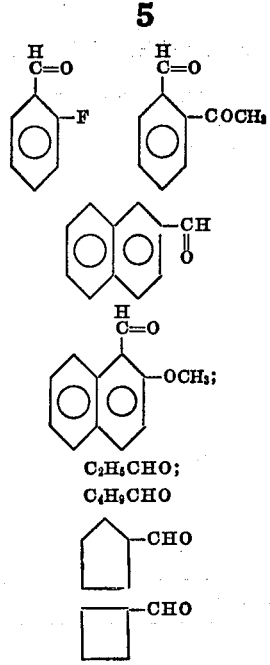

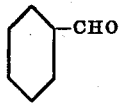

and

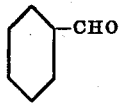-CHO

The products of this invention form salts which are also part of the invention. Basic salts form with the acid moiety as discussed above in connection with the symbol Z. Acid addition salts also form with the α-amino nitrogen. Such acid salts include, for example, inorganic salts such as the hydrohalides, e.g., hydrobromide, hydrochloride, hydroiodide, sulfate, nitrate, phosphate, borate, etc., and organic salts such as acetate, oxalate, tartrate, malate, citrate, succinate, benzoate, ascorbate, methanesulfonate and the like. It is frequently convenient to isolate and purify the product by forming a soluble or insoluble salt, as desired, then regenerating the free compound, by neutralization, for example.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins and cephalosporins. For example, a compound of Formula I or a physiologically acceptable salt thereof may be used in various animal species in an amount of about 0.1 to 100 mg./kg. daily, orally or parenterally, in single or two to four divided doses to treat infections of bacterial origin. By way of illustration the $PD_{50}$ orally in mice in a single administration is 1.3 mg./kg. against Streptococcus, 8.6 mg./kg. against Proteus and 11.8 mg./kg. against Salmonella, respectively. Up to about 600 mg. of a compound of Formula I or a salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used.

The following examples are illustrative of the invention. All temperatures are on the centigrade scale.

EXAMPLE 1

7 - [2 - (1,4 - cyclohexadien - 1-yl)-2-[[(2-hydroxy-1-naphthyl)methylene]amino]acetamido] - 3 - methyl-8 - oxo - 5 - thia - 1-azabicyclo[4.2.0]oct-2-ene-2-carboxylic acid, sodium salt, hydrate (A) Na salt of α-amino-2,5-dihydrobenzyl-3-desacetoxycephalosporin The sodium salt of α-amino-2,5-dihydrobenzyl-3-desacetoxycephalosporin (sephradine) is formed by dissolving 1396 mg. (4 millimoles) of α-amino-2,5-dihydrobenzyl-3-desacetoxycephalosporin and 336 mg. (4 millimoles) of $NaHCO_3$ in a mixture of 30 ml. $H_2O$ and 350 ml. methanol.

(B) 7 - [2 - (1,4 - cyclohexadien - 1 - yl)-[[2-hydroxy-1 - naphthyl)methylene]amino]acetamido] - 3-methyl-8 - oxo - 5 - thio - 1-azabicyclo[4.2.0]oct-2-ene-2-carboxylic acid, sodium salt, hydrate 712.4 mg. (4.2 millimoles) of 2-hydroxy-1-naphthaldehyde is added to the sodium salt solution, and the reaction mixture is stirred for 18 hours at about 10° C. Methanol is removed at less than 10° C. in vacuo, and the remaining aqueous solution lyophilized to obtain 2,125 mg. (98%) yield of a greenish yellow solid, which analyzes as follows: $C_{27}H_{24}N_3SO_5Na.H_2O$): Calcd.: 27 C, 59.66; 24 H, 4.82; 3 N, 7.73; 1 S, 5.90. Found: 27 C, 59.63; 24 H, 4.95; 3 N, 7.59; 1 S, 6.02.

EXAMPLE 2

7 - [2 - (1,4 - cyclohexadien - 1-yl)-2-[[(2-hydroxy-1-naphyl)methyl]amino]acetamido] - 3 - methyl-8-oxo-5 - thia - 1 - azabicyclo[4,2.0]oct. - 2-ene-2-carboxylic acid, sodium salt, hydrate 1,019 mg. (1.83 millimoles) of the product of Example 1 is dissolved in 400 ml. of potassium phosphate buffer (0.5 M, pH 6), and to this solution is added, 325 mg. (8.55 millimoles) of $NaBH_4$ dissolved in 15 ml. $H_2O$, dropwise, for 3 hours, with stirring, at a temperature of about 10° C. The reaction mixture is acidified to pH 3 in an ice bath, and centrifuged to separate a light brownish solid, 6.70 mg. (71% yield) of solid is isolated. After washing the solid twice with 5 ml.-portions of cold water, it is dried in vacuo. The resulting solid, 432.3 mg. (0.838 millimole), and 73.2 mg. (0.872 millimole) of $NaHCO_3$ are dissolved in a mixture of 10 ml. $H_2O$ and 30 ml. methanol. The methanol is removed in vacuo at a temperature below 10° C. The remaining solid, weighting 380 mg. (88% yield) is obtained, which analyzes as follows: ($C_{27}H_{26}N_3SO_5Na.H_2O$): Calcd.: 27 C, 59.44; 26 H, 5.17; 3 N, 7.70; 1 S, 5.82; 1 Na, 4.22. Found: 27 C, 59.14; 26 H, 5.32; 3 N, 8.01; 1 S, 6.03; 1 Na, 3.69.

EXAMPLE 3

7 - [2 - (1,4 - cyclohexadien - 1-yl)-2-[[(2-hydroxy-1-naphthyl)methylene]amino]acetamido] - 3 - methyl-8-oxo - 5 - thia - 1 - azabicyclo[4.2.0]oct-2-ene-2-carboxylic acid, sodium salt, hydrate A suspension of the sodium salt of D-2-amino-2-(1,4-cyclohexadienyl)-acetic acid 1.75 g. (10 millimoles) and 2-hydroxy-1-naphthaldehyde 3.44 g. (20 millimoles) in a mixture of ethanol (250 ml.) and methanol (20 ml.) is refluxed for 2 hours. The mixture is then evaporated under reduced pressure and the residue is washed with ether and recrystallized from ethanol to give crystals of the sodium salt of (1,4-cyclohexadien-1-yl) [[(2-hydroxy-1-naphthyl)methylene]amino]acetic acid 3.11 g. (95% yield).

This N-protected amino-acid 2.63 g. (8 millimoles) is dissolved in a mixture of dry acetone (100 ml.), dioxane (25 ml.) and 2,6-lutidine (1.35 ml.) The solution is rapidly chilled to —5°, treated with ethyl chlorocarbonate 0.955 mg. (0.84 ml., 8.8 millimoles) and stirred at 0° for 10 minutes, during which lutidine hydrochloride is precipitated and the mixed anhydride formed in solution. The suspension is then cooled to —45° and stirred vigorously while an ice-cold solution of 7-ADCA 1.31 g. (6.1 millimoles) in 3% aqueous sodium bicarbonate (28 ml.) is added as rapidly as possible, the temperature of the mixture never being allowed to rise above 0°. The resulting solution is stirred for 30 minutes, at 0° and then for a further 30 minutes without external cooling. It is then extracted with ether (3 × 150 ml.), only the aqueous phase being retained. The latter is brought to pH 2 by addition of dilute hydrochloric acid and rapidly extracted with ether (100 ml. in 3 portions). These second ether extracts, containing the N-protected cephalosporin are washed with water (10 ml.) and then extracted with sufficient 3% sodium bicarbonate to give a neutral aqueous phase, which is separated and evaporated at low temperature and pressure. The residue 1.71 g. (3.16 millimoles, 40% yield) is shown, by paper chromatography of a small portion, to contain the sodium salt of the cephalosporin of the above title.

EXAMPLES 4 TO 12

The procedure described in Example 1 is repeated with the exception that the aldehydes set out below in Table I, column A are employed, to thereby form the products set out in column B of Table I.

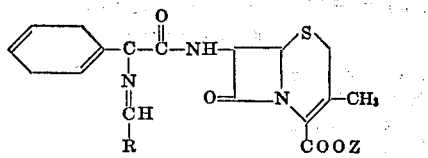

TABLE I

| Example number | Column A<br>Aldehyde(R—CHO)<br>R | Column B<br>Product<br>R |
|---|---|---|
| 4 | naphthyl-CHO | As in column A. |
| 5 | phenyl-CHO | Do. |
| 6 | 4-F-phenyl-CHO | Do. |
| 7 | naphthyl-CHO | Do. |
| 8 | methoxy-naphthyl-CHO | Do. |
| 9 | C₃H₇CHO | Do. |
| 10 | C₅H₁₁CHO | Do. |
| 11 | cyclopropyl-CHO | Do. |
| 12 | cyclohexyl-CHO | Do. |

EXAMPLES 13 TO 21

Employing the procedure described in Example 2, but substituting as the starting material, the products of Examples 4 to 12, the products set out in Table II below are obtained.

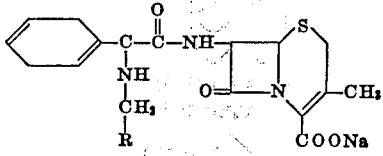

TABLE II

| Example number | R |
|---|---|
| 13 | naphthyl |
| 14 | phenyl |
| 15 | 4-F-phenyl |
| 16 | naphthyl |
| 17 | methoxy-naphthyl |
| 18 | —C₃H₇ |
| 19 | —C₅H₁₁ |
| 20 | cyclopropyl |
| 21 | cyclohexyl |

EXAMPLES 22 TO 30

Employing the procedure of Example 3, but substituting the starting material set out in column A of Table III below, the product shown in column B thereof is obtained.

(B) The product from step A (600 mg., 1.83 mm.) is suspended in a mixture of 25 ml. dry acetone, 6 ml. p-

TABLE III

| | Starting material | | Product | |
|---|---|---|---|---|
| Example number | R | Z | R | Z |
| 22 | [naphthyl] | K | As per column A | |
| 23 | [phenyl, methyl-sub] | H | As per column A | |
| 24 | [phenyl-F] | CH₃ | As per column A | |
| 25 | [naphthyl] | Na | As per column A | |
| 26 | [naphthyl-OCH₃] | H | As per column A | |
| 27 | —C₃H₇ | C₂H₅ | As per column A | |
| 28 | —C₅H₁₁ | Na | As per column A | |
| 29 | [cyclopropyl] | K | As per column A | |
| 30 | [cyclohexyl] | Na | As per column A | |

EXAMPLE 31

N-[2-(1,4-cyclohexadien - 1 - yl) - 2 - [[(2-hydroxy-1-naphthyl)methylene]amino]acetyl] - 7 - aminocephalosporanic acid (A) α-amino - 2,4 - dihydrophenylglycine (306 mg., 2 mm.), NaHCO₃ (168 mg., 2 mm.), and 2-hydroxy-1-naphthaldehyde (516 mg., 3 mm.) are dissolved in a mixture of 10 ml. H₂O and 40 ml. of methanol and stirred for 1 hour at room temperature. The methanol is then removed in vacuo at <10° and the remaining aqueous portion lyophilized. Excess aldehyde is removed from the resulting solid by washing 5 times with ether using 10 ml. for each wash. The product is a greenish-yellow solid, M.P. 101–195° having the formula

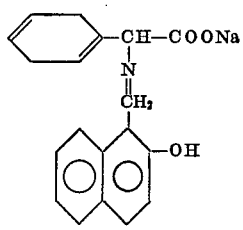

dioxane, and 0.35 ml. 2,6-lutidine. The suspension is cooled to −5°, 0.25 ml. of ethylchloroformate are added and the suspension stirred for 10 minutes at 0°. 7–ACA (472 mg., 1.83 mm.) dissolved in 20 ml. of a 1%

NaHCO₃ solution is added in one portion to the foregoing suspension and cooled to −45°. The reaction mixture is stirred for 1 hour in an ice-bath and extracted with ether using 25 ml. for each extraction. The aqueous portion is acidified to pH 2 using 1 N HCl and extracted 3 times using 8 ml. portions of a 0.3% NaHCO₃ solution for each extraction. The extracts are combined and neutralized. The product, obtained by lyophilizing the combined NaHCO₃ extracts, is a greenish-yellow solid, weighing 171 mg., M.P. 180°–185°, having the formula

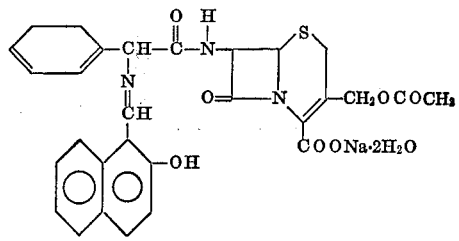

EXAMPLE 32

N-[2-(1,4-cyclohexadien - 1 - yl)-2-[[(2-hydroxy-1-naphthyl) - methyl]amino]acetyl]-7-aminocephalosporanic acid The product from part B of Example 31 (152 mg., .252 mm.) is dissolved in 10 ml. of potassium phosphate buffer (0.05 M, pH 6) and placed in an ice bath. NaBH₄ (28.7 mg., 0.756 mm.) dissolved in 2.5 ml. H₂O is added, dropwise, with vigorous stirring for 1 hour. The mixture is then acidified to pH 2 with 1 N HCl and filtered. The resulting solid is washed 3 times using 10 ml. portions of cold water for each wash, and once with 10 ml. of cyclohexane. The product is a brown solid weighing 72 mg., M.P. 197°–202° having the formula

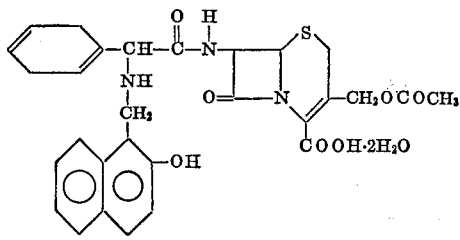

EXAMPLES 33–41

The procedure of Example 31 is repeated except substituting for 2-hydroxy-1-naphthaldehyde the respective aldehydes of Examples 4–12. The product in each case is the 7–ACA analog of the 7–ADCA product of Examples 4–12.

EXAMPLES 42–50

The procedure of Example 32 is repeated except substituting for the product of part B of Example 31, the respective products of Examples 33–41. The product in each case is the hydrogenated analog of the product of Examples 33–41 of general formula IV.

What is claimed is:

1. A compound of the formula

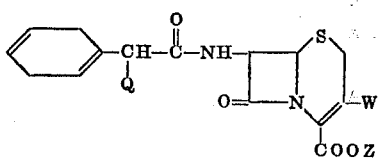

wherein Q is —N=CH—R' or —NH—CH₂—R wherein R' is alkyl of from 1 to 7 carbon atoms, cycloalkyl of from 3 to 8 carbon atoms or 2-hydroxy naphthyl, R is cycloalkyl of from 3 to 8 carbon atoms, phenyl, naphthyl, or substituted phenyl or substituted naphthyl wherein the substituent is F, Cl, Br, I, hydroxy, carbamyl, alkanoyl of up to 7 carbon atoms, alkoxy of up to 7 carbon atoms or alkyl of up to 7 carbon atoms, or substituted alkyl wherein the substituent is F, Cl, Br, I, hydroxy, or carbamyl, W is —CH₃ or —CH₂OCOCH₃, and Z is hydrogen, alkyl of from 1 to 5 carbon atoms, an alkali or alkaline earth metal, dibenzylamine or N,N-dibenzylethylenediamine.

2. A compound according to claim 1 of the formula

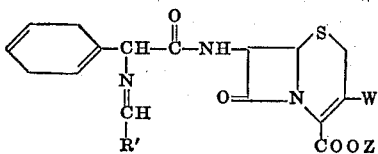

wherein R', W and Z are as defined in claim 1.

3. A compound according to claim 1 of the formula

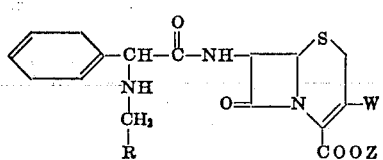

wherein R, W and Z are as defined in claim 1.

4. A compound according to claim 2 of the formula

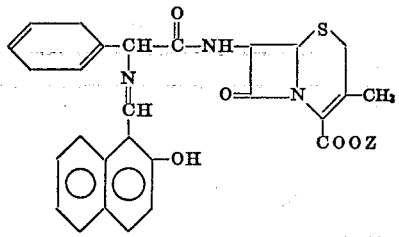

5. A compound according to claim 3 of the formula

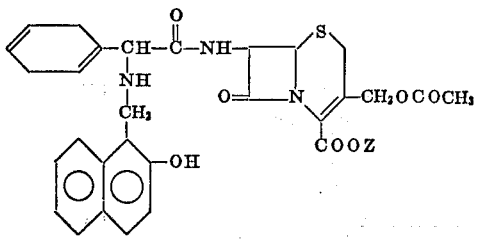

6. A compound according to claim 2 of the formula

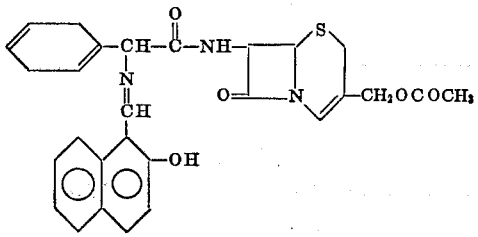

7. A compound according to claim 3 of the formula

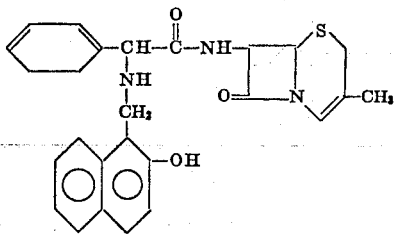

8. A compound of claim 3 wherein R is o-substituted phenyl or β-substituted naphthyl.

References Cited

UNITED STATES PATENTS

| | | | |
|---|---|---|---|
| 3,485,819 | 12/1969 | Weisenborn et al. | 260—243 C |
| 3,634,417 | 1/1972 | Attenburrow | 260—243 C |
| 3,632,581 | 1/1972 | Potoski et al. | 260—240 G |
| 3,211,745 | 10/1965 | Hofmann et al. | 260—240 G |
| 3,210,361 | 10/1965 | Humber | 260—240 G |
| 3,704,297 | 11/1972 | Dvonch et al. | 260—243 C |

HENRY R. JILES, Primary Examiner

S. D. WINTERS, Assistant Examiner

U.S. Cl. X.R.

260—243 C, 514 R, 468 R; 424—246

UNITED STATES PATENT OFFICE
CERTIFICATE OF CORRECTION

Patent No. 3,812,110  Dated May 21, 1974

Inventor(s) Bong Kuk Lee, et al.

It is certified that error appears in the above-identified patent and that said Letters Patent are hereby corrected as shown below:

Column 1, lines 20-25, the formulas should read --

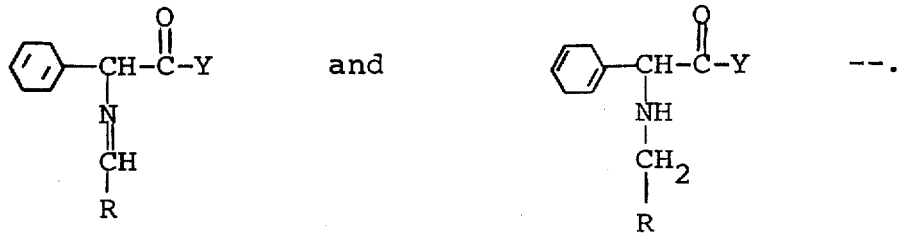

Column 1, lines 65-70, the formulas should read --

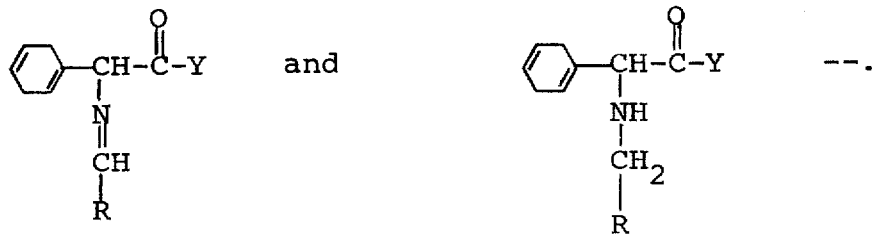

III              IV

Column 2, lines 50-55, the formula should read --

III  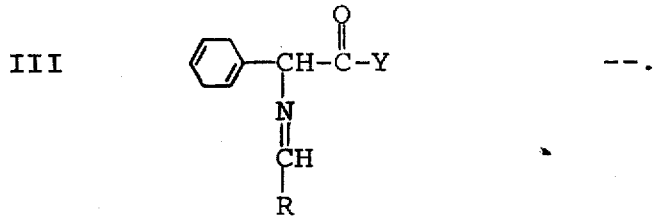  --.

Signed and sealed this 29th day of October 1974.

(SEAL)
Attest:

McCOY M. GIBSON JR.  C. MARSHALL DANN
Attesting Officer    Commissioner of Patents